Nov. 20, 1962 E. E. ALTENAU ETAL 3,065,460

FLOATING HEAD

Filed Oct. 21, 1957 2 Sheets-Sheet 1

INVENTORS
EDWARD E. ALTENAU
THEODORE W. LEVERETT
JOHN E. Mc GREGOR

BY George Baron
ATTORNEY

Nov. 20, 1962 E. E. ALTENAU ET AL 3,065,460

FLOATING HEAD

Filed Oct. 21, 1957 2 Sheets-Sheet 2

3,065,460

FLOATING HEAD

Edward E. Altenau, Theodore W. Leverett, and John E. McGregor, Poughkeepsie, N.Y., assignors to International Business Machines Corporation, New York, N.Y., a corporation of New York

Filed Oct. 21, 1957, Ser. No. 691,285

6 Claims. (Cl. 340—174.1)

This invention relates to floating heads for operation with magnetic recording devices such as drums, tapes, discs or the like, wherein there is relative motion between the reading-recording head and the magnetic recording surface of said magnetic recording devices.

A magnetic head for reading or writing pulses on a storage drum is a magnetic dipole whose field strength varies inversely as the square of the distance between head and drum surface. A very small variation in distance between head and drum results in a very large variation in the signal being sensed by the head. When the reading head can be uniformly maintained close to the recording surface, information can be more densely recorded on such recording surface.

Magnetic heads have previously been constructed such that the air film between the moving magnetic recording surface and a shoe of the magnetic head positions the gap in the magnetic head a predetermined distance from the recording surface. In certain applications it was found that these heads could not be used because (1) when the recording surface was not in motion relative to the head, the shoe rested on the recording surface, the latter tending to become damaged due to friction between the shoe and recording surface when motion was initiated; (2) the required accuracy of 0.0001 to 0.0002 inch for spacing between the lowermost portion of the head and the moving surface cannot be attained.

In accordance with this invention the shoe is spring-biased away from the recording surface while the latter is at rest, but once the desired relative motion between recording surface and shoe is reached, air pressure is applied to a surface of the shoe in a manner herein to be described so as to oppose and nullify the effect of the spring bias. The shoe would normally be urged against the recording surface by the applied air pressure were it not for the laminar flow of air that is entrained between the magnetic head and moving recording surface. This laminar flow acts to support the shoe away from the moving recording surface, such laminar flow creating a cushion on which the magnetic head rides.

The spring means for biasing the shoe away from the moving recording surface is rigidly secured at one end to the head housing or mounting so that the shoe does not experience any lateral motion with respect to the recording surface. The spring means has other functions which will be more clearly seen as the invention is defined hereinafter with more particularity.

An object of this invention is to increase the density of information packing on a recording surface by diminishing the distance at which a magnetic head can be uniformly held away from a rotating recording surface.

Another object is to provide a novel magnetic head supporting means that will minimize and/or substantially prevent any frictional contact between magnetic head and recording surface.

Still another object is to provide a novel magnetic head support that is restrained from moving laterally with respect to said recording surface so as to avoid misalignment of the magnetic head and its corresponding magnetic information on a recording surface.

A further object is to provide a magnetic head and housing of such compliance as to permit said head and housing to follow variations in the surface of a recording surface.

Yet another object is to provide a fluid bearing between a magnetic head and a recording surface wherein said fluid bearing maintains said head at a uniform distance away from said recording surface.

A further object is to eliminate the need for adjusting heads at the time of their assembly to a drum.

Other objects of this invention will become evident from the following description wherein FIG. 1 is a vertical section of a preferred embodiment of the invention;

Figure 1:
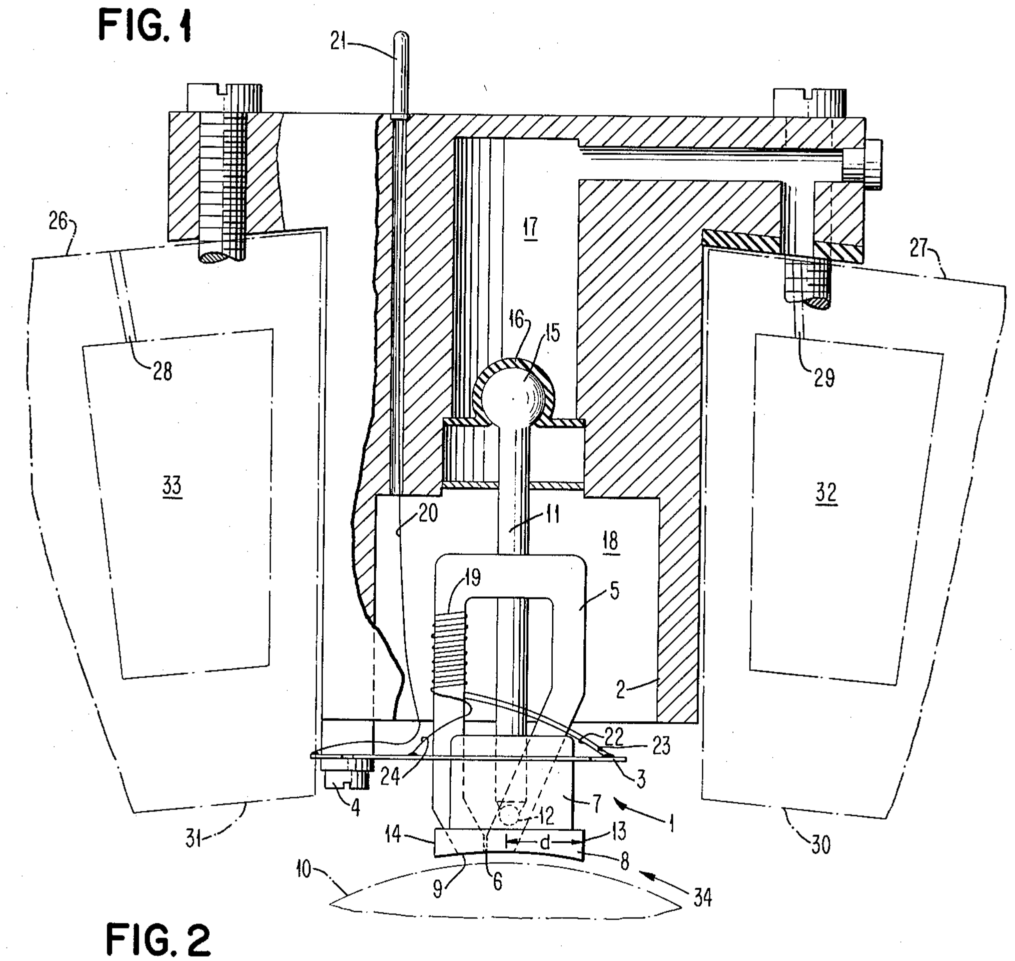

Referring to FIG. 1 there is shown an air operated floating head 1 which is supported to a head body 2 by means of spring member 3 having a thickness of the order of 2–3 thousandths of an inch of steel or an appropriate alloy material, beryllium-copper being an example of an acceptable alloy. Such spring member is suitably secured at one end to the head housing 2 by means of screws 4. The reading or writing portion of head 1 comprises core 5 made of a highly permeable material and is a continuous closed loop of magnetic material save for a gap 6 of 0.001 inch which offers a high reluctance to an otherwise closed magnetic path in core 5. The lower portion of core 5 is encased in a rigid, insulated casing 7 which could be plastic, vulcanized rubber, wood or the like. The base or shoe 8 of such casing 7 has its face 9 curved to substantially conform to the radius of curvature of the drum represented by the dotted curve 10. In some instances, better performance can be obtained when the radius of curvature of the shoe 8 is slightly greater than that of the drum 10 whose surface is moving past shoe 8.

Figure 2:
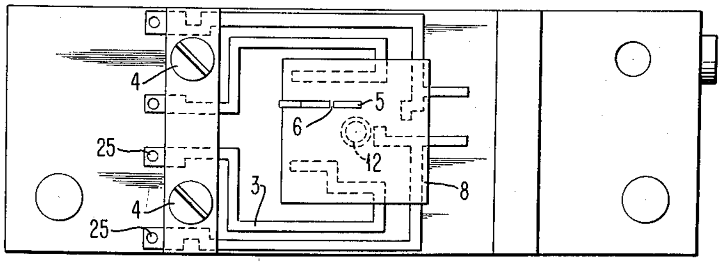
FIG. 2 is an underside view of the device of FIG. 1.

Inserted into casing 7 is a push-rod 11 whose lower tip 12 is mounted to shoe 8 through casing 7, such mounting being preferably shown as a ball and socket joint. The ball and socket joint is located at a point such that the length represented by the letter *d* is approximately fifty-eight percent of the distance between the leading edge 13 and trailing edge 14, measuring such distance back from the leading edge 13, and permits unrestrained movement of shoe 8. The other end 15 of push-rod 11 is rigidly affixed to a diaphragm 16, the latter being secured to the inner walls of air passageway 17 formed in head body 2. The diaphragm can be made of plastic, rubber, metal, or of any material that is sufficiently rigid to make an air-tight seal between the chamber 18 in which is housed the core 5 and its accompanying equipment and air passageway 17. Wrapped around one leg of core 5 are a plurality of coils 19, only one of which is shown, having their leads connected to suitable electrical terminals situated on head body 2 and flexure plate 3. For example, lead 20 would be connected to terminal plugs, such as the one terminal plug 21 shown in FIG. 1, so that either a write pulse may be sent from said plug 21 through said lead 20, or an output signal pulse appear thereat. The electrical path is from plug 21 via wire 20 to fixed end of flexure spring 3, through flexure spring 3 to a coil lead and back out the same way on another leg of core 5. Leads 22, 23 and 24 are other representative leads for the plurality of coils 19, such leads terminating on and making electrical contact with flexure spring 3. The flexure spring 3, shown in more detail in FIGS. 2 and 3, will include apertured lugs 25 that are adapted to receive electrical conductors that are part of reading or writing circuits not shown.

The head body 2 is detachably affixed to hollow head bars 26 and 27 depicted in dash-dot lines. It is understood that the heads 2 and hollow bars 26 and 27 are radially and alternately disposed about the circular drum 10 so that all the floating heads, when mounted, will be about the same distance from the magnetic surface of drum 10. The hollow head bars 26 and 27 have narrow passages 28 and 29, respectively, that are located in a manner that will permit the air chamber 17 of each head 2 to communicate with a narrow passageway 29 of its associated hollow head bar 27.

The operation of the embodiment of the invention of FIG. 1 will now be described. It is to be understood that the spacings shown in FIG. 1 are highly exaggerated and that surface 9 of shoe 8 would lie almost in an arc that includes edges 30 and 31 of hollow head bars 27 and 26, and drum periphery 10 will also conform to the general curvature of the shoe surface 9 and edges 30 and 31. The flexure plate 3 biases shoe 8 away from the surface of drum 10 while the drum is at rest so that when drum rotation commences there is no frictional contact between shoe 8 and drum 10.

Once the drum 10 has attained a predetermined speed, a manually or automatically operated relay (not shown) is actuated to cause air under a regulated pressure to enter chambers 32 and 33 of their respective hollow head bars 27 and 26, such air flowing through restricted passageways 29 and 28 into chambers, such as chamber 17, to apply a downward force on push-rod 11 through diaphragm 16. Such downward force of air opposes the upward force of flexure spring 3 so as to nullify the latter's effect in keeping the shoe 8 away from the periphery of the rotating drum 10. Consequently when a laminar flow of air is entrained between shoe 8 and drum 10 when the latter rotates in the direction of arrow 34, the shoe in effect "rides" on such air stream. Moreover, the forward edge 13 is lifted further away from drum surface 10 by the laminar flow of air between the latter and shoe surface 9 so that gap 6 is substantially closer to surface 10 than any other portion of surface 9.

The reliance on flexure spring 3 made of a corrosion resistant, high-endurance strength alloy permits vertical displacement of shoe 8 but prevents its lateral displacement. Moreover such flexure spring 8 also carries portions of the electrical circuits required for reading and writing, thus eliminating the problems inherent in constantly flexing wires as the head 1 responds to the eccentricity of rotating drum 10. The air supply for each chamber 17, by being fed through narrow apertures 28, 29, permits the removal of several heads 1 during drum operation without causing a pressure drop in hollow heads 26 and 27 sufficient to affect the operation of the remaining heads whose housings use the same air pressure supply. Since the shoe 8 never contacts the drum 10, its life is almost unlimited. It is also noted that the shoe 8 is loaded through a ball and socket joint 12 to translate the motion of push-rod 11 to such shoe 8. Such ball and socket joint permits the shoe 8 to approach or depart from the drum surface 10 with essentially no load. Such "no load" conditions are necessary because the force of the laminar air stream on the shoe 8 created by drum rotation remains very small until the shoe 8 is within a few ten thousands of an inch from the drum surface. Moreover the gap 6 is located closer to the trailing edge 14 than to the leading edge 13 of shoe 8, so that such gap 6 is urged as closely as possible towards drum surface 10 during its operating speed.

Figures 3, 4, 5:
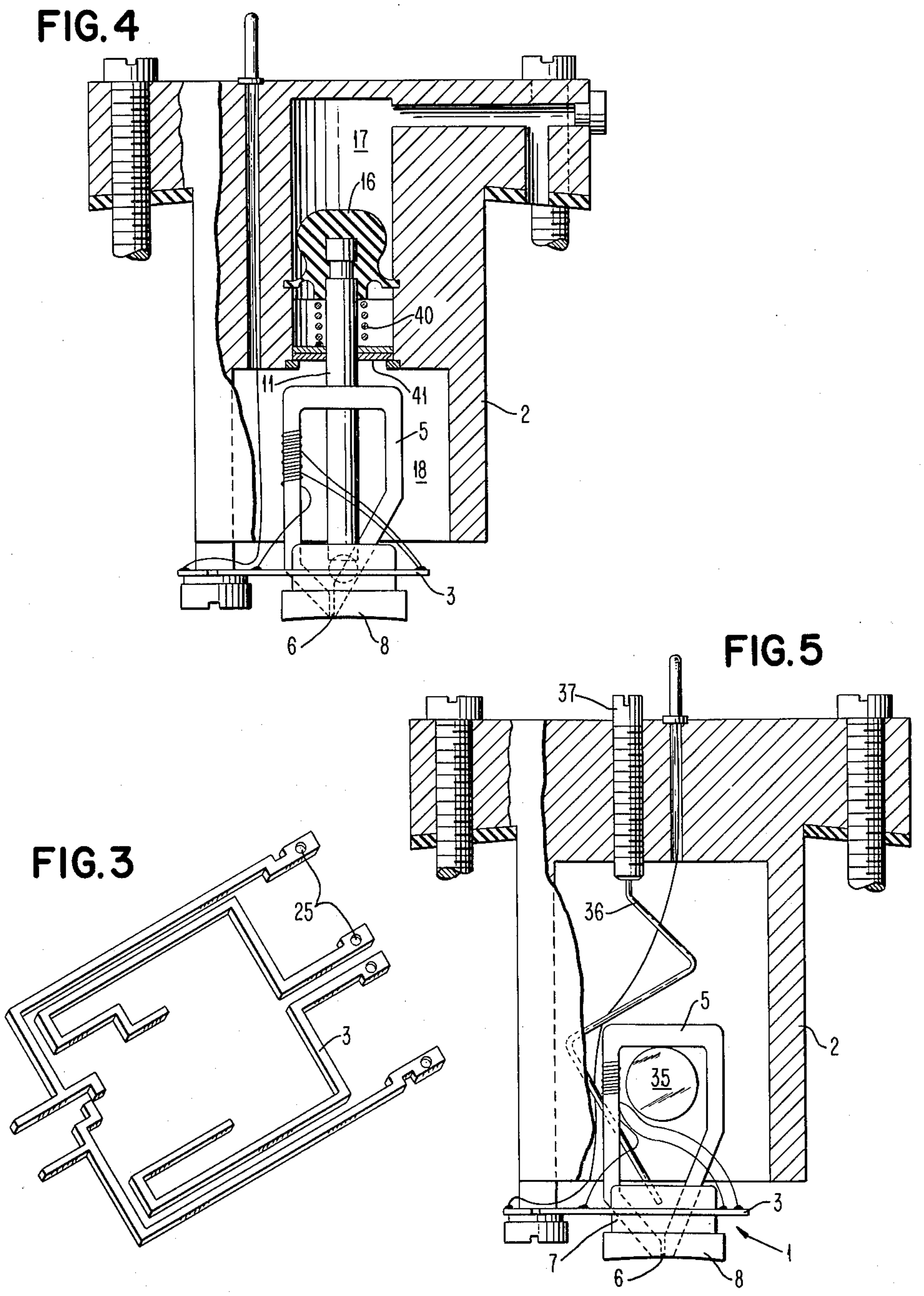
FIG. 3 is an isometric of a preferred embodiment of a spring for biasing a shoe and magnetic head.
FIG. 4 is a second embodiment of the invention shown in FIG. 1.
FIG. 5 is a third embodiment of the invention shown in FIG. 1.

The embodiment of the invention shown in FIG. 4 is similar to that shown in FIG. 1 save that diaphragm 16' not only serves to transmit the force of the air under pressure to the shoe 8 via push-rod 11, but it also is made of a material having spring-like characteristics so that diaphragm 16' itself provides a force to lift the shoe 8 away from the drum surface 10 until such air pressure assumes operating level. If the diaphragm 16' does not have spring-like characteristics, then a spring 40 and washer 41 could be employed to attain the force necessary to urge the push-rod 11 away from drum surface 10.

The embodiment of the invention depicted in FIG. 5 does not provide for air pressure through a chamber 17 to actuate a shoe 8 through a push-rod 11. Each head 1 is manually adjustable. Cam 35 is rotated so as to withdraw shoe 8 away from a drum surface while the latter is at rest. Once operating speed of the drum is reached, cam 35 is rotated so that core 5, flexure plate 3 and shoe 8 will fall toward the drum surface. However, the laminar flow of air will prevent shoe 8 from contacting the rotating drum surface. Wire spring 36 has one end impinging on casing 7 through a recess in the latter and its other end maintained under the heel of adjustable screw 37. Screw 37 is turned to vary the tension of spring 36 so as to change the spring pressure against casing 7 and therefore shoe 8, thus varying the separation of gap 6 from the surface of its corresponding rotating drum. The modification of the invention shown in FIG. 5 permits each head 1 to be individually adjustable without relying upon air pressure.

This invention has provided an improved floating head type of assembly which will enable one to increase the surface bit density of a magnetic storage drum by permitting such novel head to maintain a smaller core-to-drum spacing than was heretofore obtainable.

We claim:

1. In combination, a record medium, apparatus for recording or reproducing intelligence on said record medium, including a shoe member, means for causing the surface of said record medium to have a relatively rapid movement past said apparatus, a housing for said apparatus, a movable rod secured at one end to said apparatus and lying in said housing, a diaphragm secured to the other end of said rod, a resilient member rigidly secured to said housing and said shoe member and adapted to bias the latter away from said record medium surface, means for applying air pressure against said diaphragm so as to urge said rod to oppose the effective force of said resilient member.

2. In combination, a record medium, apparatus for recording or reproducing intelligence on said record medium, means for causing the surface of said record medium to have a relatively rapid movement past said apparatus so as to create an air film on such surface, a housing for said apparatus, a rod having a universal joint at one end, means for confining said rod in said housing to substantially vertical movement, said joint being secured to said apparatus, a resilient member rigidly secured to said housing and said apparatus and adapted to bias the latter away from said surface, a diaphragm secured to the other end of said rod and forming an air chamber with the walls of said housing, means applying air pressure to said air chamber against said diaphragm so as to urge said rod to oppose and nullify the effective force of said resilient member whereby said apparatus is maintained away from contact with said surface solely by such created air film.

3. The combination of claim 2 wherein said diaphragm is a spring-like element adapted to urge said rod and its attached recording or reproducing apparatus away from contact with said record medium surface.

4. In combination, a record storage drum having some lack of concentricity, recording heads and hollow head bars cooperating with said drum and alternatingly disposed about said drum periphery, a housing for each recording head and adapted to be supported by said hollow head bars, means secured to each housing for biasing each recording head away from the periphery of said storage drum, means for applying air pressure through said hollow head bars to said housing so as to counteract said biasing means.

5. The combination as set forth in claim 4 wherein each hollow head bar has a narrow aperture which coacts with a single housing whereby the removal of a recording head during the rotation of the drum will not substantially diminish the air pressure being applied to the remaining heads.

6. In combination, a record storage drum having some lack of concentricity, recording heads and hollow head bars cooperating with said drum and alternatingly disposed about said drum periphery, each recording head having a shoe with a substantial surface near the periphery of the drum, a housing for each recording head and adapted to be supported by said hollow head bars, means secured to said housing for biasing said recording head and shoe away from contact with said drum periphery, means for applying air pressure through said hollow head bars to said housings so as to counteract said biasing means, each hollow head bar having a narrow aperture which coacts with a single adjacent housing whereby the removal of recording heads during the rotation of the drum will not substantially effect the air pressure being applied to the remaining heads.

References Cited in the file of this patent

UNITED STATES PATENTS

| | | |
|---|---|---|
| 1,387,746 | Webb | Aug. 16, 1921 |
| 2,612,566 | Anderson | Sept. 30, 1952 |
| 2,790,875 | Bancroft | Apr. 30, 1957 |
| 2,790,966 | Malbon et al. | Apr. 30, 1957 |
| 2,862,781 | Baumeister | Dec. 2, 1958 |
| 2,886,651 | Vogel | May 12, 1959 |
| 2,937,240 | Harker | May 17, 1960 |
| 2,969,435 | Lynott | Jan. 24, 1961 |

FOREIGN PATENTS

| | | |
|---|---|---|
| 763,780 | Great Britain | Dec. 19, 1956 |